J. Sattison,
Cultivator.

No. 110,682. Patented Jan. 3, 1871.

Inventor.
Jacob Sattison
Pr Burrowes & Co
Atty's

Witnesses.
W. H. Burridge
D. B. Humphrey

UNITED STATES PATENT OFFICE.

JACOB SATTISON, OF RIPLEY TOWNSHIP, HURON COUNTY, OHIO.

IMPROVEMENT IN CULTIVATORS.

Specification forming part of Letters Patent No. 110,682, dated January 3, 1871.

*To all whom it may concern:*

Be it known that I, JACOB SATTISON, of Ripley township, in the county of Huron and State of Ohio, have invented a certain new and Improved Cultivator; and I do hereby declare that the following is a full, clear, and complete description of the same, reference being had to the accompanying drawings, making a part of this specification, in which—

Figure 1:
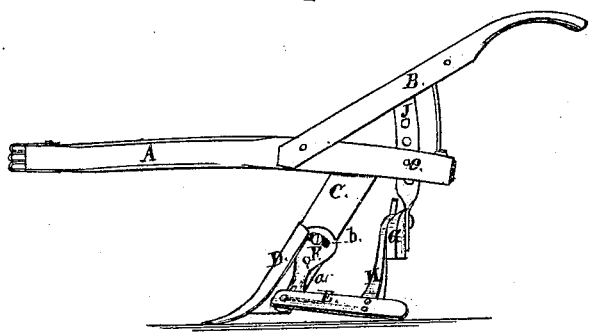
Figure 2:
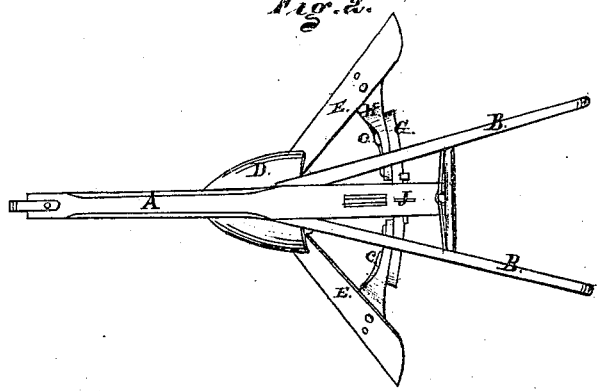
Figure 3:
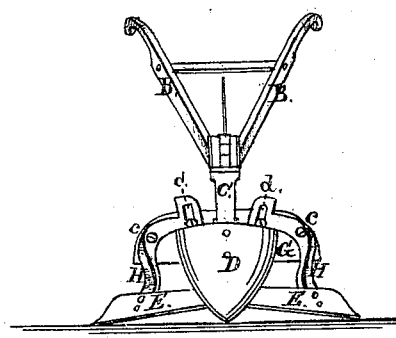
Figure 4:
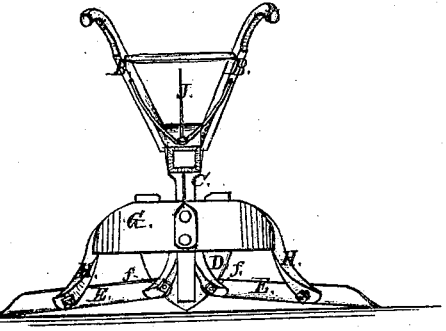

Figure 1 is a side view of the cultivator. Fig. 2 is a top view of the same. Fig. 3 is a front view. Fig. 4 is a view of the rear side.

Like letters of reference refer to like parts in the several views.

The nature of this invention relates to a cultivator, the construction of which is such that the wings or shares thereof can be expanded or contracted, and at the time of their expansion the shares are made to assume a more horizontal position, so that said shares or wings may have a cutting or shearing like action in the ground and upon the grass, weeds, &c., as hereinafter more fully described.

In Fig. 1, A represents the beam of the cultivator; B, the handles, and C the standard, to which the share D is secured in a rigid manner.

E E are wings or side shares. The front end of each share is attached to the standard referred to by means of an adjustable link, F, Fig. 1. Said link is pivoted to the standard at the point *a*, and secured thereto by a screw inserted in a slot, *b*, in the upper end, as shown in Fig. 1, whereby it may be adjusted, for a purpose presently shown.

The opposite or rear ends of the shares are connected to a cross-beam, G, Figs. 3 and 4, by means of adjustable links or standards H, pivoted to the beam at the points *c*, and which may be adjusted in their relation to the beam by means of screws inserted in slots *d*, Fig. 3. Said cross-beam G is connected to the beam A by means of a link, J, Fig. 1. The link passes loosely through the beam, and is secured therein by a pin, *e*, inserted in the beam and link, as shown.

The practical advantage of a cultivator thus constructed is that it can be easily and readily adjusted to run between wide or narrow rows of corn or other plants simply by loosening the screws in the slots *c d*, Figs. 1 and 3, of the links and standards F H. This will allow their lower end to spread outward from the position shown in Fig. 3 to that shown in Fig. 4, and at the same time the vertical position of the plane of the shares is changed from that approaching a perpendicular to that nearer a horizontal, as shown in Fig. 4, in which position it presents less vertical surface to the ground, and will therefore run more easily through the soil than before, cutting the weeds, instead of scraping off, hence doing the work more effectually and with less labor, and at the same time agitating a wider space of ground than can be done by the ordinary cultivator. By thus causing the shares to become more nearly horizontal when spread out, the dirt will not be thrown too much upon or against the standing plants, but it will simply slide back over the share, thereby leaving the ground level, with the grass and weeds cut, and the surface of the ground agitated near to the growing plants.

The wings or shares may be caused to run more or less deep in the ground by raising or lowering them, and which may be done by loosening the nuts *f*, Fig. 4, of the bolts, whereby the front ends of the shares are secured to the links F.

A slot in the links, and through which the bolts pass, allows the shares to be adjusted in their height from the ground, so as to regulate their working depth.

The rear end of the shares is adjusted by the graduated link J, referred to, which may be raised or lowered, thereby raising or lowering the rear end of the shares, as may be required.

The wings may be entirely removed and the cultivator used with only the shares D as an ordinary shovel-plow.

What I claim as my invention, and desire to secure by Letters Patent, is—

1. The adjustable slotted links or standards H, pivoted to the cross-beam G, in combination with the shares or wings E, substantially as described, and for the purpose specified.

2. The adjustable slotted links H, when pivoted to the vertically-adjustable cross-beam G, adjustable slotted links F, when pivoted to the standard C, in combination with the shares E, in the manner as described, and for the purpose specified.

3. The arrangement of the shares E, adjustable slotted links F, adjustable slotted links or standards H, cross-beam G, beam A, and share D, in the manner as described, and for the purpose set forth.

JACOB SATTISON.

Witnesses:
J. H. BURRIDGE,
W. H. BURRIDGE.